Patented May 4, 1926.

UNITED STATES PATENT OFFICE.

ALMON A. HEATH, OF PUEBLO, COLORADO.

ENGRAVING PROCESS.

No Drawing.  Application filed July 17, 1925. Serial No. 44,359.

*To all whom it may concern:*

Be it known that I, ALMON A. HEATH, a citizen of the United States, residing at Pueblo, in the county of Pueblo and State of Colorado, have invented new and useful Improvements in Engraving Processes, of which the following is a specification.

The present invention relates to a process of engraving or etching designs or figures upon zinc or other metal plates for the purpose of rendering these metal plates suitable for printing such designs or figures, and has for its object the production of etched zinc or metal plates in a new and improved manner, whereby the use of photographic negatives is entirely eliminated. Other objects of the invention will appear evident from a consideration of the description which follows.

In practising my invention I first make a copy of the design, figure or drawing with a pen or brush with black ink, or other light impervious vehicle, upon thin celluloid or upon transparent or translucent paper, cloth or similar substance. This transparent copy must be the exact size of the etching desired. This design, figure or drawing is then transferred to a sensitive plate by exposure to light which affects all parts of the sensitive plate not shielded by the lines of the drawing, rendering them insoluble in the warm water used in the washing operation to be described later.

This sensitive plate is made of a piece of glass slightly larger than the dimensions of the desired etching. The glass is thoroughly cleaned with a paste made of whiting and water with a small quantity of aqua ammonia included. After the glass plate has been thoroughly cleaned, the sensitive solution may be applied. The sensitive solution comprises ammonium bichromate, clarified gelatine, distilled water and glycerine. The sensitive solution is spread over the glass plate by pouring a small quantity thereof in the center of the plate and allowing it to spread to the outer edges. The surplus is allowed to drain off and the plate is put on a whirler, or other machine for evenly spreading the film, and spun very rapidly until there is only a thin yellow film on the plate. The film upon the plate is then dried and the plate is then ready for use. It is to be understood that the preparation of the sensitive solution and the plate is accomplished with the exclusion of light affecting the sensitive solution or plate.

More particularly the sensitive solution above described is prepared from the following substances, in the named proportion, and compounded as described below:

Ammonium bichromate__ 50 grains
Water, distilled _____ 4 ounces
Gelatine, clarified _____ ¾ ounce
Glycerine_____ 10 drops (minims)

The gelatine is put into cold water and allowed to absorb as much water as it will for five minutes or more. The excess of water is drained off and the gelatine is put into a glass graduate. The glass graduate is filled up to two ounces with distilled water and placed into a pan of warm water which is being gently heated. The gelatine will dissolve and mix with the water. The 50 grains of ammonium bichromate are then dissolved in two ounces of distilled water and added to the solution of lukewarm gelatine and stirred therewith vigorously until a homogeneous and thorough mixture is produced. After this mixing operation, the glycerine is added and thoroughly incorporated by stirring, whereupon the solution is ready for use in the formation of the sensitive glass plate described above. Coarse or undissolved particles may be removed by filtering or straining of the solution.

The transparent copy, prepared as described above, is placed upon the sensitive plate in such a manner that its back is against the film part of the plate, so that the image printed upon the plate will be superposable upon the transparent copy, that is to say, they will not bear the relation that an object bears to its image in a mirror. The plate and transparent copy are next placed into a photographic printing frame and exposed to sunlight for about twenty seconds or to artificial light for a greater length of time depending upon the strength of it. The light will penetrate the transparent parts of the copy, that is to say, those parts not covered by ink or the like, and cause such parts to become relatively insoluble in water through stimulated action between the gelatine and ammonium bichromate. Those parts of the plate beneath the lines of the design, figure or drawing of the copy are shielded from the influence of light and remain soluble in water. After the exposure to light the plate is removed from the printing frame and developed in warm water. This developing, broadly stated, consists in dissolving away the soluble parts of the gelatine film, which results in the production of the design, figure or drawing upon the glass plate by means of lines, spaces or openings upon the sensitive plate free of the gelatine mixture. It will be evident, therefore, that each part of the plate corresponding to an inked or covered part of the transparent copy will be free of the gelatine mixture and will be freely transparent. If the film does not adhere to the glass in developing, the time of exposure was too short and more time should be allowed. Should the film adhere too much, that is to say, if those parts which should dissolve do not dissolve readily, the time of exposure to light has been too long and should be shortened. In using transparent copies made upon paper the time of exposure should be slightly longer than when using copies made upon celluloid.

In the developing operation the exposed plate is placed into a pan of warm water and the plate is moved back and forth or the pan rocked so as to cause the water to develop the image, figure or drawing by dissolving away the gelatine in the unexposed parts of the plate, thereby leaving, as above described, the clear glass. The plate is then dipped into a dark colored dye, preferably garnet dye which is customarily used in dyeing wool. The plate is then held up to the light for a moment to see if the development is complete. If it is not, the plate is put back into the warm water and moved back and forth as before, until the development is complete. After the development the plate is again put into the dye, which must be hot, and the dyeing continued until the film has turned a deep ruby red color. The plate is preferably rinsed with just enough water to remove the excess of dye before drying. The rinsing must be moderate, as too much rinsing will take off the dye. When dry, the back of the plate must be cleaned so that there will be no obstruction to light passing through the plate.

The next step in the process consists in preparing a sensitive zinc or other metal plate in a manner somewhat similar to the preparation of the sensitive glass plate. Generally stated the sensitive zinc plate is prepared by placing over one surface thereof a film comprising fish glue, ammonium bichromate, water and glycerine and then drying. The details of preparation of the sensitive zinc plate are given below.

The developed glass plate is then placed face down upon the film side of the sensitized zinc plate, that is to say, with the films adjacent to each other, and the two are then exposed in a printing frame to light as in the exposure of the transparent copy and the sensitive glass plate. The light passes through the clear parts of the glass plate and renders insoluble those parts of the gelatine on the zinc plate which corresponds to lines or ink covered parts in the transparent copy. During the developing operation of the zinc plate described in detail below the soluble parts of the sensitive film are washed away, leaving the design or figure produced upon the zinc plate in the form of gelatine instead of ink or other drawing material.

The zinc used in making the sensitized zinc plate should be the regular article used by photo-engravers. This zinc is about $\frac{1}{16}$ of an inch thick and should be cut to the dimensions of the desired etching. The zinc plate must be thoroughly cleaned with the whiting paste, heretofore mentioned, as any grease spots or foreign substances on the zinc will prevent the sensitive solution, from which the sensitive film is produced, from adhering properly.

The sensitive solution is prepared from three-fourths (¾) of an ounce of dry fish glue, four (4) ounces of distilled water, fifty (50) grains of ammonium bichromate and ten (10) drops of glycerine. The fish glue is soaked until soft in about two ounces of water, and as soon as it is soft it is put into a glass graduate. The glass graduate is then placed into a pan of warm water, which may be continuously gently heated, and the glue is allowed to dissolve, after which the mixture is allowed to cool. The fifty grains of ammonium bichromate are then dissolved in two ounces of water and thereafter thoroughly mixed with the cool glue and water. Approximately ten drop of glycerine are then added, and the whole vigorously stirred until a uniform mixture results. If necessary to remove course or undissolved particles, the solution may be filtered or strained. The solution thus prepared is ready for use.

In sensitizing the zinc plate, the above described bichromated fish glue solution is spread upon the cleaned zinc plate in any convenient manner, after which, in order to spread the film uniformly, the whirler hereinbefore mentioned is used. After the zinc has been covered with a thin film of the sensitizing solution it is dried and is then ready for use. The preparation of the zinc plate and solution must obviously be performed with the exclusion of light destroying the sensitive character of the film and solution.

As indicated above, the glass plate is placed in the printing frame with the glass side out, that is to say, with the film side of the glass plate adjacent to the film side of the zinc. This will result in an image upon the zinc which bears the same relation to the original figure, design or drawing, as an object bears to its image in a mirror, with the result that when a print is ultimately made from the etched plate it will be directly superposable upon the transparent copy. The exposure necessary for printing is from approximately 3 to 10 minutes in sunlight or a greater time for artificial light depending upon its strength.

After exposure the zinc is removed from the printing frame and a very thin coat of engraving ink is applied, for example with a brush, to the entire film. Caution must be exercised to not apply too much ink, as, if too much is applied, it will run upon the zinc during the developing operation. After the ink has been applied, the zinc plate is ready to be developed. To accomplish this it may be held under a faucet from which issues a gentle flow of water and all of the film will dissolve or wash away except where the image is printed. When the development is complete the zinc and film image thereon is dried either by warming or fanning. As indicated above, the image on the zinc plate is a duplicate in insoluble glue of the original figure, design or drawing upon the transparent copy with the exception that it bears the same relation to it as an object bears to its image in a mirror. Consequently, when the zinc plate is etched by and as described below, the parts which are uncovered by insoluble glue will be in part removed, and when an impression is taken from the etched surface, a print exactly corresponding to the original transparent copy will be obtained.

The developing and drying of the zinc plate is followed by a treatment with dragon's blood. For this treatment the dragon's blood must be very finely pulverized. It is brushed over the plate and a quantity will adhere to the inked lines. All excess of powder is then brushed off and the zinc plate is held over a flame to burn in the film and the dragon's blood. The image will turn very black by this burning operation. I preferably apply the dragon's blood to the image about three times, and the last time it is preferably burned in until a light blue smoke arises from the plate. The plate is then ready for the "first bite" of the acid or etching bath. However, before the plate is put into the bath, the back and edges of the plate must be coated with shellac to prevent the acid from acting on those parts.

The etching bath is made by adding one part nitric acid to about nine parts of water. If the acid simmers on the zinc, it is too strong and should be weakened by adding a little water. The acid bath may be conveniently contained in a wooden, water tight box painted on the inside with an asphaltum or other resistant paint.

The plate is put into the acid bath and the box or tub containing the bath is rocked. After rocking, when the etching has progressed a little, the plate must be brushed gently to remove the dissolved metal so that the etching may proceed evenly. The etching operation should be carefully watched. When the fine lines seem to be in danger of being etched away, the plate should be removed from the bath and rinsed in a little clear water. Then it should be dried by warming and examined closely. If any of the composition which protects the image has become detached, these spots should be touched up with a little engraving ink. After this a coat of dragon's blood should be applied to the entire image. The excess of powder should be brushed off and the remainder burnt in. The plate should be allowed to cool a little, but while it is still warm, the dragon's blood is preferably again applied and brushed down against the sides of the lines from the top to the bottom of the plate. The dragon's blood should bank against the sides of the lines. All excess of powder should be removed and the burning in of the powder repeated. This treatment with dragon's blood is preferably repeated two or three times or until the lines are well protected on all sides. To protect all sides of the lines it will be necessary to brush in the dragon's blood powder from various portions of the plate. It is very important to protect the sides of the lines in this way and will usually have to be done two or three times before the etching is carried deep enough. The dragon's blood may fill in between some of the lines where they come close together; but this does not matter for the etching does not have to be very deep in these places. It will also be necessary to strengthen the acid bath as the etching operation progresses. This is done by removing the zinc plates from the bath and adding acid until the original strength or other suitable strength is attained. After the bath has been strengthened several times, for example, four or five times, it has been found advisable to use an entirely new one. When the plate has been etched down to about one-third of the $\frac{1}{16}$ inch thick zinc plate, the etching operation is discontinued. The plate is then ready for gouging with acid described in the following paragraph. The open spaces between the lines of the image usually require deeper etching. In order to do this the entire image is covered with engraving ink to which dragon's blood is applied and burned in or the image may be covered with shellac. The etching is then continued until the plate is etched about half-way through its thickness.

The back and face of the plate are thoroughly cleaned with gasoline or wood alcohol, and the plate prepared for mounting upon a block of wood or other holder. Before mounting upon wood or other holding means, the edges of the plate are trimmed and the rough edges filed off. The plate is secured or fastened, for example, to the block of wood by small brads, being thoroughly flattened before it is nailed into position. The process of producing the etched plate is now finished and the plate is ready for the printing press.

Having described my invention, what I claim as new and desire to secure by Letters Patent is:

The method of engraving the surface of metal which comprises producing an image from a transparent copy of the design to be engraved upon a transparent medium sensitized with a colloid including a compound for rendering parts thereof exposed to light insoluble, removing soluble parts of the colloid from said transparent medium, rendering the undissolved parts resistant to the transmission of light, thereafter forming upon a similarly sensitized metal surface a print of the transparent medium, removing soluble parts of the colloid from the metal surface, and then etching the parts of the metal from which the colloid has been removed.

In testimony whereof I affix my signature.

ALMON A. HEATH.